United States Patent
McQueen

(10) Patent No.: US 11,867,137 B1
(45) Date of Patent: Jan. 9, 2024

(54) JET ENGINE HAVING ELECTRICALLY POWERED SUPERHEATING SECTION

(71) Applicant: Jesse LaSalle McQueen, Livingston, TX (US)

(72) Inventor: Jesse LaSalle McQueen, Livingston, TX (US)

( * ) Notice: Subject to any disclaimer, the term of this patent is extended or adjusted under 35 U.S.C. 154(b) by 0 days.

(21) Appl. No.: 17/964,134

(22) Filed: Oct. 12, 2022

Related U.S. Application Data

(60) Provisional application No. 63/360,715, filed on Oct. 25, 2021.

(51) Int. Cl.
| | |
|---|---|
| *F02K 3/08* | (2006.01) |
| *F02C 6/00* | (2006.01) |
| *F02C 1/04* | (2006.01) |

(52) U.S. Cl.
CPC ............ *F02K 3/08* (2013.01); *F02C 1/04* (2013.01); *F02C 6/003* (2013.01); *F05D 2220/323* (2013.01)

(58) Field of Classification Search
CPC .... F02C 1/04; F02C 1/05; F02C 3/365; F02C 6/003; F02C 7/08; F02C 7/32; F02K 3/115; F02K 3/08; F01D 25/10; F01D 15/10; F03H 99/00; B64D 27/24
See application file for complete search history.

(56) References Cited

U.S. PATENT DOCUMENTS

| | | | | |
|---|---|---|---|---|
| 3,678,306 | A * | 7/1972 | Garnier | F02C 7/04 417/406 |
| 4,692,671 | A * | 9/1987 | Dishner | F02C 7/32 322/40 |
| 6,644,014 | B2 * | 11/2003 | Provitola | F03H 99/00 60/202 |
| 7,073,319 | B1 | 7/2006 | Rhyme | |
| 7,095,126 | B2 | 8/2006 | McQueen | |
| 7,690,186 | B2 * | 4/2010 | Dooley | F02K 3/06 60/770 |
| 8,631,655 | B2 * | 1/2014 | Dooley | F01D 15/10 60/773 |
| 9,601,970 | B2 * | 3/2017 | French | F02C 7/36 |
| 10,797,628 | B2 * | 10/2020 | French | B81B 7/02 |
| 2003/0029159 | A1 * | 2/2003 | Provitola | F03H 99/00 60/203.1 |
| 2007/0101696 | A1 * | 5/2007 | Dooley | F02C 1/04 60/204 |
| 2011/0036093 | A1 * | 2/2011 | Dooley | F02C 1/04 290/1 R |
| 2014/0252774 | A1 | 9/2014 | Boaventura-Delanoe et al. | |

(Continued)

FOREIGN PATENT DOCUMENTS

CN 114753925 A * 7/2022 ............ F02C 1/05

*Primary Examiner* — Alain Chau
(74) *Attorney, Agent, or Firm* — Gugliotta & Gugliotta LPA

(57) ABSTRACT

A jet engine is provided having a front compression stage for pressurizing intake air, and a central superheating section for further increasing the temperature and pressure of the pressurized intake air from the front compression stage. The central superheating section is at least partially electrically powered by an internal energy generating power source. A rear exhaust nozzle stage recovers energy from a discharge of the superheating section and creates thrust.

9 Claims, 3 Drawing Sheets

(56) References Cited

U.S. PATENT DOCUMENTS

2014/0360205 A1* 12/2014 French ............... F02K 3/06
                                                290/46
2016/0076450 A1*  3/2016 Burkett ............. F02C 1/05
                                                60/203.1

* cited by examiner

JET ENGINE HAVING ELECTRICALLY POWERED SUPERHEATING SECTION

RELATED APPLICATIONS

The present application claims the benefit of U.S. Provisional Application 63/360,715, filed on Oct. 25, 2021 and incorporated by reference as if fully rewritten herein.

BACKGROUND OF THE INVENTION

1. Field Of The Invention

The present invention relates generally jet engines and, more particularly, to an improved non-combustion jet engine.

2. Description Of The Related Art

An airbreathing jet engine (or ducted jet engine) is a jet engine that ejects a propelling (reaction) jet of hot exhaust gases after first taking in atmospheric air, followed by compression, which heats and expands back to atmospheric pressure through a nozzle. Alternatively the reaction jet may include a cold jet of ducted bypass air which has been compressed by a fan before returning to atmospheric pressure through an additional nozzle. These engines are gas turbine engines. Engines using only ram for the compression process, and no turbomachinery, are the ramjet and pulsejet.

As shown typically in conjunction with FIG. 1, all airbreathing jet engines of the PRIOR ART heat the incoming air by burning fuel. Alternatively a heat exchanger may be used in which the expansion air is heated by nuclear-powered jet engine. For example, in U.S. Pat. No. 7,073,319, issued in the name of Rhyme, a nuclear-fueled power generating system is disclosed in which an apparatus for generating electricity is disclosed that uses at least one jet engine fueled with fissile material. Such a jet engine within this design, at its most basic, replaces, inter alia, a hydrocarbon combustion heat source with nuclear-fueled motor in a burner section having a fuel core of fissile material therein.

Some other methods and devices are known that incorporate various mechanisms for replacing combustion heat sources. Of particular interest, for example, U.S. Pat. No. 7,095,126, issued to the present inventor and incorporated by reference herein, teaches an external power source such as a battery is used to initially supply power to start an alternator and generator. Once the system has started it is not necessary for the battery to supply power to the system. The battery can then be disconnected. The alternator and electric motor work in combination to generator electrical power. The alternator supplies this electrical power to the two inverters. One inverter outputs part of its power to the lamp load device and part back to the electric motor/generator. This power is used to power the electric motor. The second inverter supplies power to the specific load devices that are connected to the system.

It is preferable that the teaching of the '126 patent may be incorporated into and adapted for replacing combustion elements within a jet engine. Consequently, a need exists for such an improved non-combustion jet engine.

SUMMARY OF THE INVENTION

It is thus an object of the present invention to provide a method of replacing combustion within a jet engine with a non-combustion heat source for enabling expansion of compressed air entering therein.

It is a feature of the present invention to provide an electrically powered heating element(s) for creating expansion of superheated air within a jet engine Briefly described according to the present invention, a jet engine is provided where a front compression stage pressurizes intake air that is communicatd through a central superheating section for further increasing the temperature and pressure of the pressurized intake air from the front compression stage. The central superheating section is at least partially electrically powered, to augment combustion heating, or may be completely electrically powered in replacement of combustion heating. The central superheating section forms a plurality of electrically heated channels organized as an array of conduits through electrically powered heating elements that are electrically powered by an electrical power source. The electrical power source may include an electric motor capable of producing electric energy, a battery for supplying an initial amount of power to said electric motor, and an alternator power source connected to said initial power source and said electric motor for continuously supplying power to said electric motor. A first inverter system is connected to the electric motor and has an input through which the first inverter system receives energy produced by the electric motor. The first inverter system also has one output through which the first inverter supplies power back to said electric motor to supply the electric motor with power.

Advantages of the present intention include reduced weight, increased flight time, reduction of an explosion or fire hazard and decreased pollution.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

For purposes of the present disclosure the terms "a" and "an" herein do not denote a limitation of quantity, but rather denote the presence of at least one (1) of the referenced items. Further for purposes of the present disclosure the terms "in", "out", "left" "right", "up" or "down" are all spacial and functionally relative directions used to aid in the description to best explain the principles of the invention and its practical application, and to aid others skilled in the art to best utilize the invention and are not meant to be limiting to any particular orientation. It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Figure 1:
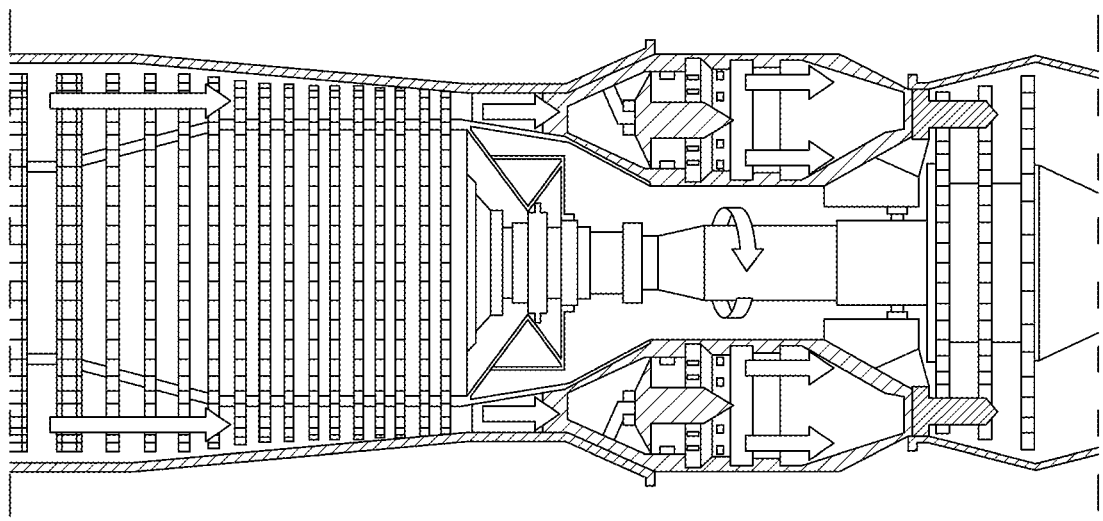
FIG. 1 depicts a cross sectional schematic of an airbreathing jet engine (or ducted jet engine) according to the PRIOR ART.
Figure 2:
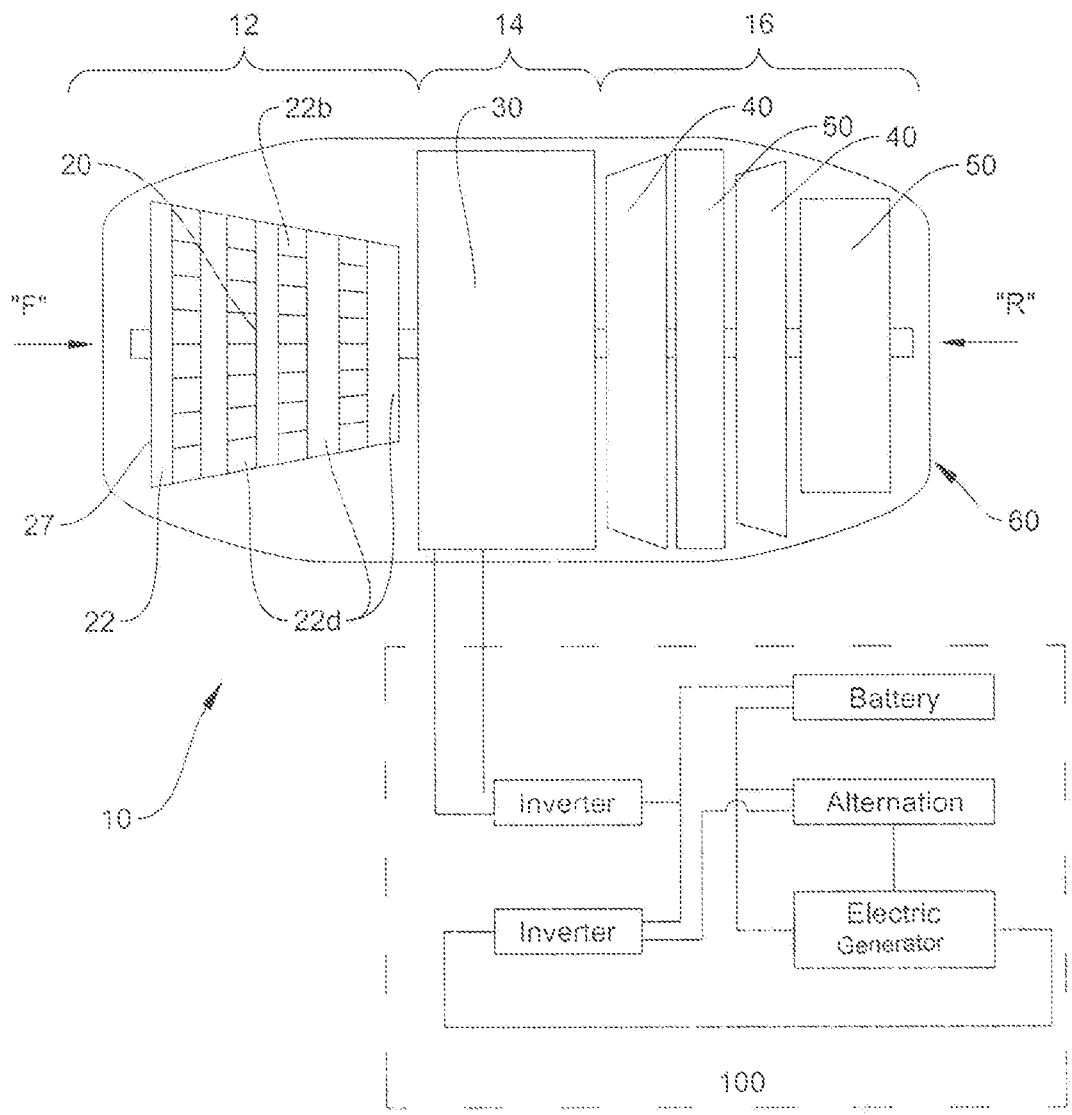
FIG. 2 depicts a cross sectional schematic of a non-combustion jet engine in accordance with a preferred embodiment of the present invention.
Figure 3:
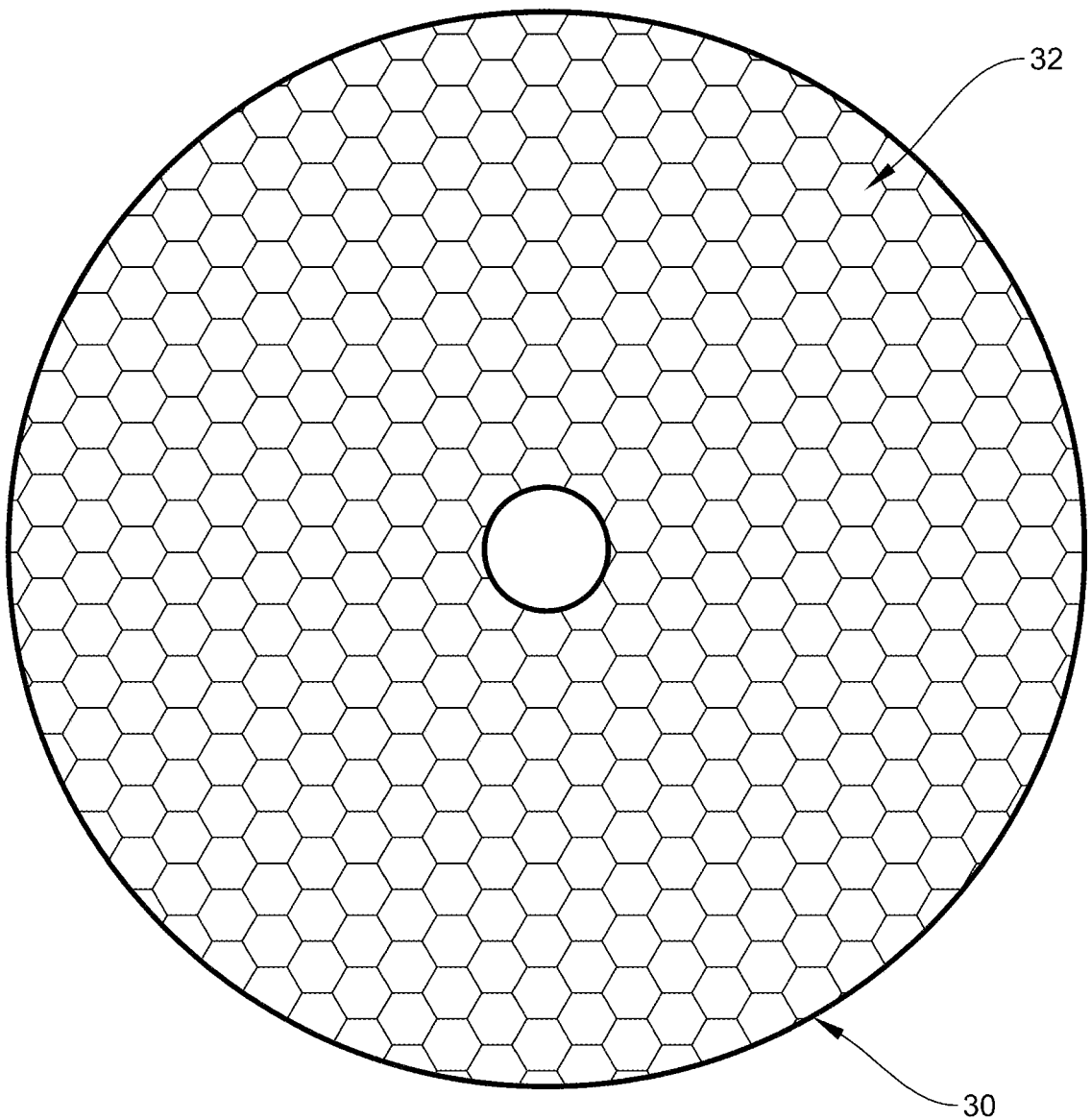
FIG. 3 is a front elevational view of a typical electrical heating element 32 for use therewith.

The best mode for carrying out the invention is presented in terms of its preferred embodiment, herein depicted within the FIGS. 2-3.

1. Detailed Description of the Figures

Referring now to the drawings, wherein like reference numerals indicate the same parts throughout the several views, a jet engine, generally noted as 10, is provided. The jet engine 10 may include an inner operational core comprised of three main stages: a front compression stage 12; a central heating section 14; and a rear exhaust nozzle stage 16.

The front compression stage 12 may include a compressor 20 at the front "F" of the engine 10. The compressor 20 may include fan blades 22 incorporating, some rotating components (rotors) 22a and some static components (stators) 22b adapted for drawing air into the engine 10. There may be many rows of blades 22 configured so as air passes by each row it becomes more pressurized. With increasing pressure the incoming atmospheric air is also heating to an elevated level.

The central heating section 30 provides a superheating section. The central heating element 30 may provide a plurality of electrically heated channels 32. The channels 32 may be organized as an array of honeycomb conduits through electrically powered heating elements 34 that are powered by an electrical power source 100 as described in greater detail below. This central, electrically powered heating section 30 substantially replaces the hydrocarbon fueled combustion chamber of the PRIOR ART, in which the pressurized air is then sprayed with fuel (most commonly Jet A or Jet A-1 which are of a kerosene-type), and then the fuel and air mixture ignited in the combustion chamber. Instead of using the air/fuel mixture to burn and greatly increase pressure and temperature, the electrically powered heating element 30 causes superheating of the compressed intake air to create the greatly increased pressure and temperature.

The rear exhaust nozzle stage 16 may include one or more turbines 40 in which the heated, pressurized air is drawn out of the heating element 30 at the rear "R" of the engine 10. By passing the pressurized, superheated air over the turbines 40 turbine energy may be removed from the airflow, causing a drop in pressure and temperature. As the pressure decreases, the gas flows faster to pass over a second of more stage of turbines 40. Additional heater elements 50 may be provided between stages of turbines 40 to provide additional thrust by electrically heating the turbine discharge gasses. After multiple stages of energy recovery, the high-velocity gases being released through the nozzle 60 at the rear "R" causes thrust. Additionally, the energy from the gas that drives the turbine 40 may further be communicated to and used to rotate the compressor 20 which draws in air at the front "F" of the engine 10.

As indicated above, the heating element 30, as well as any reheater(s) 50 are preferably electrically powered from an electrical power source 100. The electrical power source 100 is most preferably may be an internal energy generating power source such as taught in U.S. Pat. No. 7,095,126, or a similar or functional equivalent thereof. Such a power source 100 comprises a system including a battery source (e.g., 12 volt DC) that connects to an electrical alternator whereby the battery supplies an initial power to initiate/start the operation of an alternator. The alternator is in communication with an electric generator connected to a first inverter and a second inverter. The battery may also connect to both inverters. The first inverter may communicate with and operate the electric generator and alternator combination. The second inverter may communicate with and feed one or more of the heaters 30 or reheaters 50. With the first inverter having an input from which power is received from the alternator and the second inverter having an input that also receives power from the alternator, after initiation of the system through power supplied by the battery the alternator and generator combination may subsequently work in combination to generator electrical power to the heaters 30, 50.

An important aspect of the present invention is the loop between the alternator, electric motor and the first inverter. A portion of power generated by the electric motor is recycled and is used to power the electric motor. In this way the system produces the power internally that is used to power the system. An additional aspect of the present invention may further allow the power takeoff from the turbines 40 to further mechanically rotate an alternator/generator combination.

2. Operation of the Preferred Embodiment

In operation, the present may be used in the place of otherwise conventional jet engines. The electrical heating element 30, powered by the power generator 100 or functionally similar or equivalent power generator, may provide the electrical energy needed to operate the heater 30 to create the pressurized, superheated air from the intake. It is further envisioned that the functional structure described herein may also be used in conjunction with a combustion heater, thereby augmenting the performance of otherwise conventional jet engines with some of the benefits and features provided through electrical heating.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical,* 520 US 17 (1997) or *Festo Corp. v. Shoketsu Kinzoku Kogyo Kabushiki Co.,* 535 U.S. 722 (2002), or other similar caselaw or subsequent precedent should not be made if any future claims are added or amended subsequent to this Patent Application.

What is claimed is:

1. A jet engine having an electrically powered superheating section comprising:
   a heating element;
   one or more reheaters;
   an electrical power source configured to power the heating element and the one or more reheaters, the electrical power source comprising:
   a battery source connected to an electrical alternator;
   an electric generator connected to a first inverter and a second inverter, said first inverter having an input through which it receives energy produced by said alternator, and also having one output through which it supplies power back to said electric generator, wherein the first inverter operates the electric generator and alternator in combination, and the second inverter feeds power to the heating element or the one or more reheaters;
   wherein, after initiation of the system through power supplied by the battery source, the alternator and generator work in combination to generate electrical power to the heating element and the one or more reheaters.

2. The jet engine of claim 1, wherein the battery source supplies an initial power to initiate/start the operation of the alternator.

3. The jet engine of claim 1, wherein the electrical power source is an internal energy generating power source.

4. The jet engine of claim 1, wherein the first inverter receives power from the alternator and the second inverter receives power from the battery source.

5. The jet engine of claim 1, wherein:
   a. the engine further comprises:
      i. a front compression stage for pressurizing intake air;
      ii. a central superheating section for further increasing the temperature and pressure of the pressurized intake air from the front compression stage; and
      iii. a rear exhaust nozzle stage recovering energy from a discharge of the superheating section and creating thrust;
   b. the central superheating section is at least partially electrically powered by the electrical power source; and
   c. the central superheating section is connected to said first inverter via an inverter system output to alter the electric current traveling from said first inverter such that the current feeding into the central superheating section is not purely inductive.

6. The jet engine of claim 5, wherein the central superheating section further comprise:
   a plurality of electrically heated channels organized as an array of conduits through electrically powered heating elements that are electrically powered by said electrical power source.

7. The jet engine of claim 6, wherein:
   a. the second inverter is provided with:
      i. a first input connected from said battery source;
      ii. a second input connected from said alternator; and
      iii. an output connected to the central superheating section;
   b. the alternator, electric generator, and first inverter form a loop recycling a portion of the generated power back to said electric generator.

8. The jet engine of claim 6, wherein the rear exhaust nozzle stage comprises at least one turbine configured to draw heated, pressurized air out of the heating element, facilitating energy removal, a drop in pressure and temperature, and augmenting airflow to generate thrust.

9. The jet engine of claim 6, wherein the rear exhaust nozzle stage comprises:
   a. a first turbine;
   b. at least a second turbine positioned subsequent to said first turbine; and
   c. an electrically powered heater that is one of the one or more reheaters, located between said first turbine and said second turbine, wherein the turbines draw heated, pressurized air out of the heating element, facilitating energy removal, a drop in pressure and temperature, and augmenting airflow to generate thrust.

* * * * *